(12) United States Patent
Crum

(10) Patent No.: US 7,681,344 B2
(45) Date of Patent: Mar. 23, 2010

(54) SHOPPING CART DEVICE

(75) Inventor: Bryan Crum, Louisville, KY (US)

(73) Assignee: Cart-TV, LLC, Louisville, KY (US)

( * ) Notice: Subject to any disclaimer, the term of this patent is extended or adjusted under 35 U.S.C. 154(b) by 153 days.

(21) Appl. No.: 11/773,783

(22) Filed: Jul. 5, 2007

(65) Prior Publication Data

US 2008/0010873 A1 Jan. 17, 2008

Related U.S. Application Data

(63) Continuation-in-part of application No. 11/458,524, filed on Jul. 19, 2006.

(60) Provisional application No. 60/595,714, filed on Jul. 29, 2005, provisional application No. 60/595,877, filed on Aug. 12, 2005, provisional application No. 60/744,634, filed on Apr. 11, 2006.

(51) Int. Cl.
*G09F 3/00* (2006.01)
(52) U.S. Cl. .................. 40/308; 40/660; 40/611.08; 40/661.12; 40/606.03; 40/725; 280/288.4
(58) Field of Classification Search .............. 280/288.4, 280/304.5
See application file for complete search history.

(56) References Cited

U.S. PATENT DOCUMENTS

| | | | |
|---|---|---|---|
| 2,864,189 A | 12/1958 | Campbell | |
| 2,888,761 A | 6/1959 | Miller | |
| 3,082,557 A | 3/1963 | Huff | |
| 3,251,543 A | 5/1966 | Bush et al. | |
| 3,964,134 A | 6/1976 | Newtson | |
| 3,982,659 A * | 9/1976 | Ross | 221/63 |
| 4,292,749 A | 10/1981 | Thomas | |
| 4,496,058 A | 1/1985 | Harris et al. | |
| 4,535,912 A * | 8/1985 | Bonk | 221/46 |
| 4,583,753 A | 4/1986 | Economy | |
| 4,685,701 A | 8/1987 | Amundson et al. | |
| 4,848,117 A | 7/1989 | Welborn et al. | |
| 4,899,886 A * | 2/1990 | Johansen | 206/555 |
| 4,901,901 A | 2/1990 | Reitnour | |
| 4,978,006 A * | 12/1990 | Juteau | 206/449 |
| 4,988,025 A | 1/1991 | Lipton et al. | |
| 4,993,583 A * | 2/1991 | Chasen | 220/482 |
| 5,002,215 A | 3/1991 | Gregoire | |
| 5,004,252 A | 4/1991 | Kraper | |
| 5,038,986 A | 8/1991 | Beauchesne | |
| 5,048,736 A | 9/1991 | Anatra | |
| 5,086,960 A | 2/1992 | Schwietzer | |
| 5,114,009 A * | 5/1992 | Johnston | 206/425 |
| 5,263,578 A | 11/1993 | Narvey | |
| 5,306,953 A | 4/1994 | Weiner | |

(Continued)

FOREIGN PATENT DOCUMENTS

CA 2459153 10/2004

(Continued)

*Primary Examiner*—Lesley Morris
*Assistant Examiner*—Christopher E Veraa
(74) *Attorney, Agent, or Firm*—Camoriano and Associates; Theresa Fritz Camoriano

(57) ABSTRACT

A display mounted on a shopping cart handle allows shoppers to find information, to obtain coupons, to refer to in-store audio or video programs, and the like.

4 Claims, 12 Drawing Sheets

U.S. PATENT DOCUMENTS

| | | |
|---|---|---|
| 5,424,524 A | 6/1995 | Ruppert et al. |
| 5,429,377 A | 7/1995 | Duer |
| 5,489,120 A | 2/1996 | Thornsburg |
| 5,566,609 A | 10/1996 | Kirschner |
| 5,597,104 A | 1/1997 | Elliott |
| 5,617,982 A | 4/1997 | Wilson |
| 5,848,723 A * | 12/1998 | Krautsack .................... 221/35 |
| 6,158,640 A | 12/2000 | Karp |
| 6,284,177 B1 * | 9/2001 | Ewing ........................ 264/140 |
| 6,299,119 B1 | 10/2001 | Dunning |
| 6,898,884 B1 | 5/2005 | Meyenberg |
| 2002/0070141 A1 * | 6/2002 | Iida ............................ 206/494 |

FOREIGN PATENT DOCUMENTS

| | | |
|---|---|---|
| GB | 2176332 | 12/1986 |
| WO | WO9200560 | 4/1992 |
| WO | WO9611130 | 4/1996 |

* cited by examiner

SHOPPING CART DEVICE

This is a Continuation-In-Part of, and claims priority from U.S. application Ser. No. 11/458,524 filed Jul. 19, 2006, which claims priority from U.S. Provisional Application 60/595,714 filed Jul. 29, 2005; U.S. Provisional Application Ser. No. 60/595,877 filed Aug. 12, 2005; and U.S. Provisional Application Ser. No. 60/744,634 filed Apr. 11, 2006, all of which are hereby incorporated by reference.

BACKGROUND

Summary

The present invention relates to a device that can be mounted on a shopping cart. The device provides a way to display print advertising or other visual materials to shoppers while they are shopping in a store. In one embodiment, the device has a display area which may receive a card, a magazine, or a sheet dispenser for dispensing sheet materials such as coupons. The magazine may have several "flip-up" pages that may contain information such as advertisements, in-store specials, store directories, recipes, schedules of in-store TV or radio programs, and the like. The sheet dispenser may include recipes, coupons for products described in the magazine, or other visual materials that the shopper might want to take. Other types of display materials may also be received on the device.

BRIEF DESCRIPTION OF THE DRAWINGS

FIG. 13 is a side perspective view of the magazine of FIG. 11;

DESCRIPTION

Figure 1:
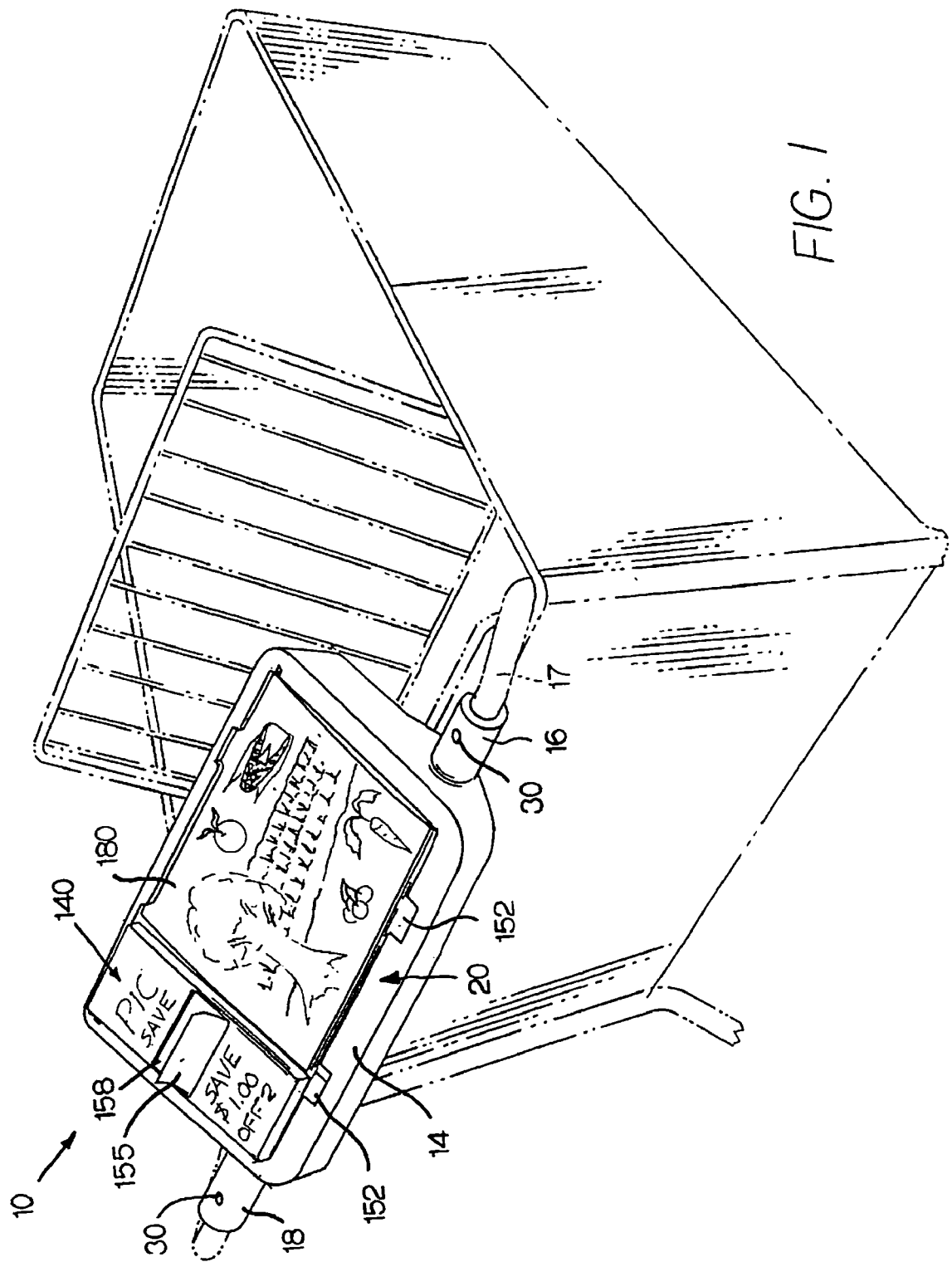
FIG. 1 shows one embodiment of a device made in accordance with the present invention mounted on the handlebar of a shopping cart.

FIGS. 1-10 show an example of a device 10 for providing visual information on a shopping cart. This device 10 is mounted on the shopping cart handlebar, and, in this particular embodiment, it holds a coupon dispenser 140 (shown in FIGS. 14 and 17), and a magazine 180 (shown in FIG. 13). It could alternatively hold other items, such as a display card 221, shown in FIG. 20. Looking at FIG. 2, it can be seen that the device 10 includes a main body 11, which defines a central display area 20, and a right handle 16 and a left handle 18 rigidly attached to and projecting outwardly from the main body 11. (In this particular embodiment, the device 10 is molded as a single unit, so the handles 16, 18 are attached to the main body 11 as part of the molding process.) The display area 20 includes a flat, rectangular backplate 12 and a rectangular frame 14, which surrounds the periphery of the backplate 12. Of course, other shapes could also be used, including ovals, squares, pentagons, hexagons, other polygons, stars, or various other shapes. The frame 14 includes a lip 22, which is spaced above the backplate 12 and extends around the periphery of the backplate 12. The lip 22 allows an advertising or display card, magazine, or coupon dispenser to be tucked between the backplate 12 and frame 14 and to be securely held in place. The frame 14 can also have advertising material or other print adhered to it or printed on it. In this embodiment, the handles 16, 18, are textured, having a rougher surface than the frame 14 in order to facilitate gripping the handles. However, the body 11 could also be textured. The handles 16, 18 could also have advertising material printed or adhered on them.

Looking again at FIG. 1, it can be seen that the handles 16, 18 will be gripped by the shopper in order to push the shopping cart, putting the display area in a good position for being viewed by the shopper.

Figure 2:
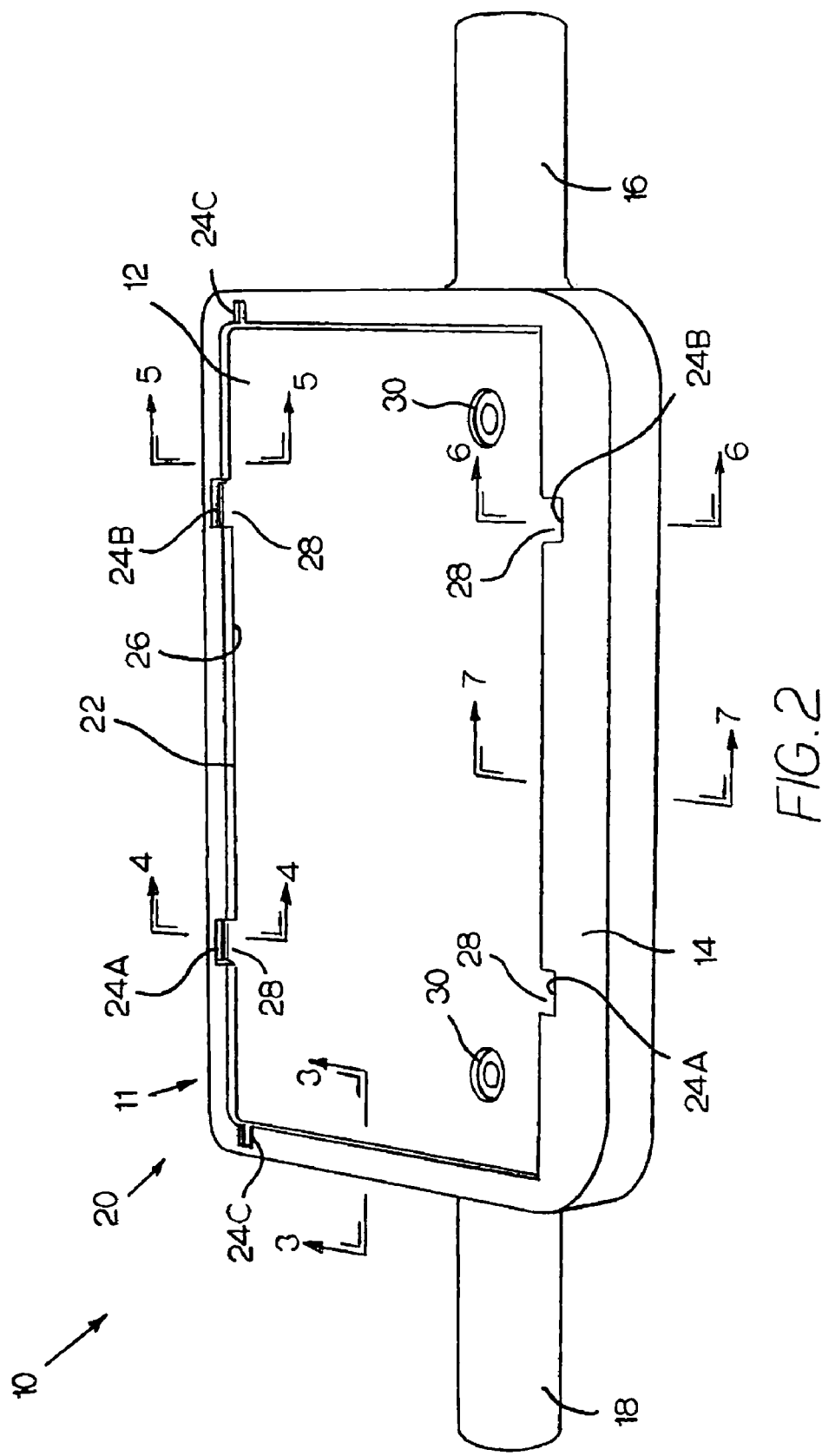
FIG. 2 is a front perspective view of the device of FIG. 1.

The lip 22 generally extends around the entire periphery of the backplate 12. However, as shown in FIG. 2, there are several pairs of opposed discontinuities 24 in the frame 14, which facilitate the insertion of advertising materials onto the backplate 12. In this embodiment, there are two pairs of discontinuities 24A, 24B located on the front and back of the frame 14 and one pair 24C located on the sides near the back. The discontinuities 24A are located in from the left side of the frame 14 about one-fourth of the width of the entire backplate 12. Similarly, the discontinuities 24B are located in from the right side about one-fourth of the width of the entire backplate 12. It is preferred that the discontinuities in the front and rear frame 14 be located in from their respective sides a distance between one-eighth and one-third of the width of the entire backplate. There is no lip (or only a very shallow lip) 22 at the discontinuities 24. The frame 14 is connected to the backplate 12 at tabs 28, and between the tabs 28 there are gaps 26 between the frame 14 and the backplate 12, where there is no connection between the frame 14 and the backplate 12. In this particular embodiment, the tabs 28 are located at some of the discontinuities 24, but the tabs could be located at other places instead of or in addition to being located at the discontinuities. (See FIGS. 4 and 6 for more detail of the tabs and discontinuities.) The discontinuities 24 make it easier to install items such as a sheet dispenser, magazine page(s), display cards, etc, and the gaps 26 allow for water drainage, as will be discussed in detail later.

In this particular embodiment, the backplate 12 and frame 14 are connected together only by the tabs 28 that extend outwardly from the backplate 12 in the same plane as the backplate 12, and that merge with the bottom of the outer edge of the frame 14 at some of the discontinuities 24A, 24B.

Also, in this embodiment, there is a pair of opposed small discontinuities 24C toward the top of the right and left sides of the frame 14. These particular discontinuities 24C make it easier to install a display card 221 (shown in FIG. 20), which covers the entire backplate 12. Such a display card (or other object to be installed) is slid downwardly through the small discontinuities 24C and beneath the lip 22.

Figure 3:
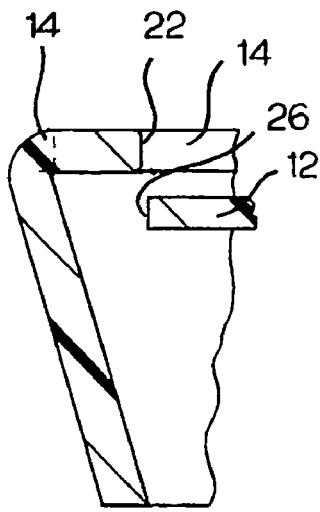
FIG. 3 is a view taken along the line 3-3 of FIG. 2.

FIG. 3 is a section through the left side of the body 11, showing the frame 14, the backplate 12, the lip 22, and a gap 26.

Figure 4:
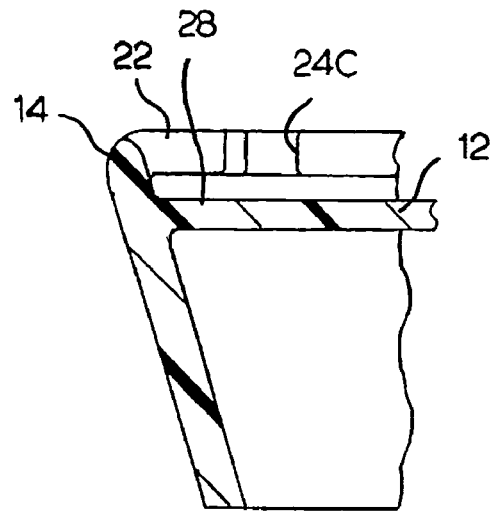
FIG. 4 is a view taken along the line 4-4 of FIG. 2.

FIG. 4 is a section through the rear discontinuity 24A showing the tab 28 which connects the backplate 12 to the frame 14. This view also shows the discontinuity 24C and the lip 22.

Figure 5:
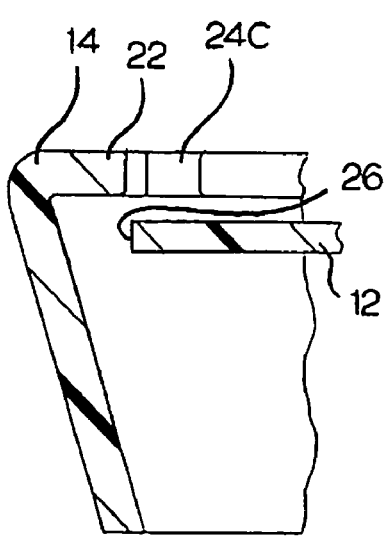
FIG. 5 is a view taken along the line 5-5 of FIG. 2.

FIG. 5 is a section through the rear part of the frame 14, showing the lip 22, the discontinuity 24C, the backplate 12, and a gap 26.

Figure 6:
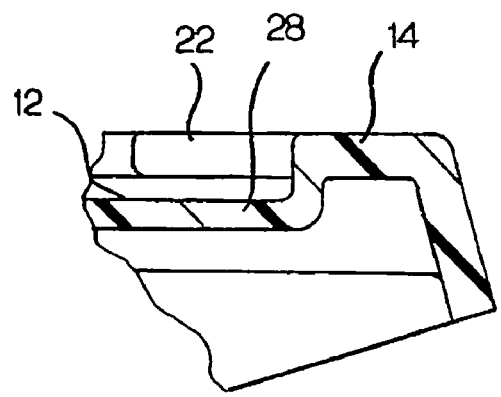
FIG. 6 is a view taken along the line 6-6 of FIG. 2.

FIG. 6 is a section through the front discontinuity 24B, showing the lip 22, the tab 28, the frame 14, and the backplate 12.

Figure 7:
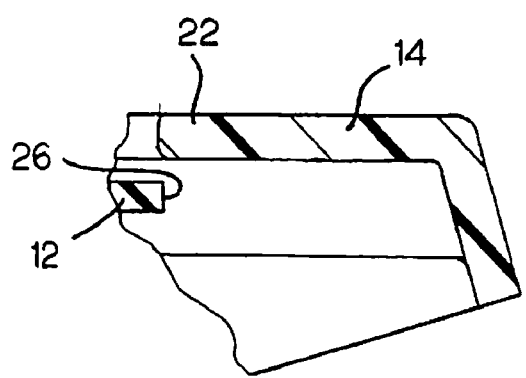
FIG. 7 is a view taken along the line 7-7 of FIG. 2.

FIG. 7 is a section view through the front part of the frame 14, showing the lip 22, the gap 26, the frame 14, and the backplate 12. It should be noted that the gaps 26 in the forward part of the frame as shown in this figure provide a place for water to drain so that when the shopping cart is exposed to the rain, the water will flow down over the backplate 12 and drain out through the front gaps 26.

Referring to FIGS. 1, 2, 8, and 11, the handles 16, 18, are rigidly attached to and project outwardly from the right and left sides of the body 11. Both handles 16, 18 have a C-shaped cross section defining an opening 19 that allows them to wrap partially around the handlebar of a standard shopping cart when installed. The distance between the ends of the C-shaped opening 19 is slightly smaller than the diameter of the shopping cart handlebar 17, and the inside diameter of the cross section is slightly larger than the diameter of the shopping cart handlebar 17 so that the handles 16, 18 open up slightly and then snap into place over the cart handlebar 17. To install the device 10, the installer removes the old handle (if there is one), aligns the handles 16, 18 with the handlebar 17 of the shopping cart, and simply presses the handles 16, 18, downwardly onto the shopping cart handlebar 17. The handles 16, 18, flex sufficiently that the opening 19 opens wide enough to allow the handles 16, 18, to snap into place over the handlebar 17, with the opening 19 returning to its original size once the handles 16, 18, have snapped into place.

In other embodiments, the handles 16, 18 need not necessarily snap around the handlebar; alternatively, they could be designed so they would simply rest on top of the handlebar and be secured via screws, clasps, or any other known mounting means. Alternatively, the device 10 may be installed directly over the existing handle on the shopping cart, without having to remove it to expose the handlebar 17. Once the device 10 is snapped into place, it may then be screwed onto or otherwise secured to the handlebar 17, if desired.

Figure 8:
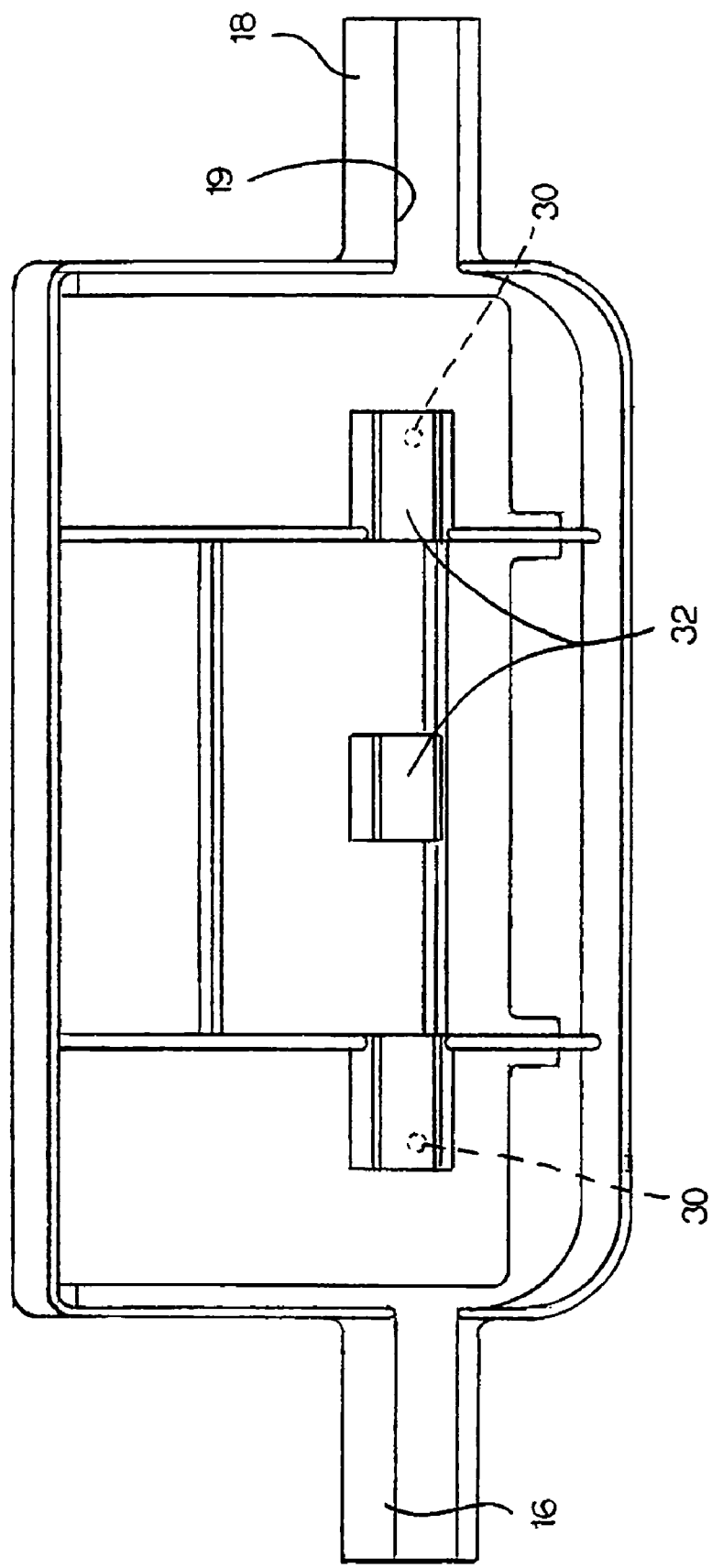
FIG. 8 is a rear view of the device of FIG. 2.
Figure 9:
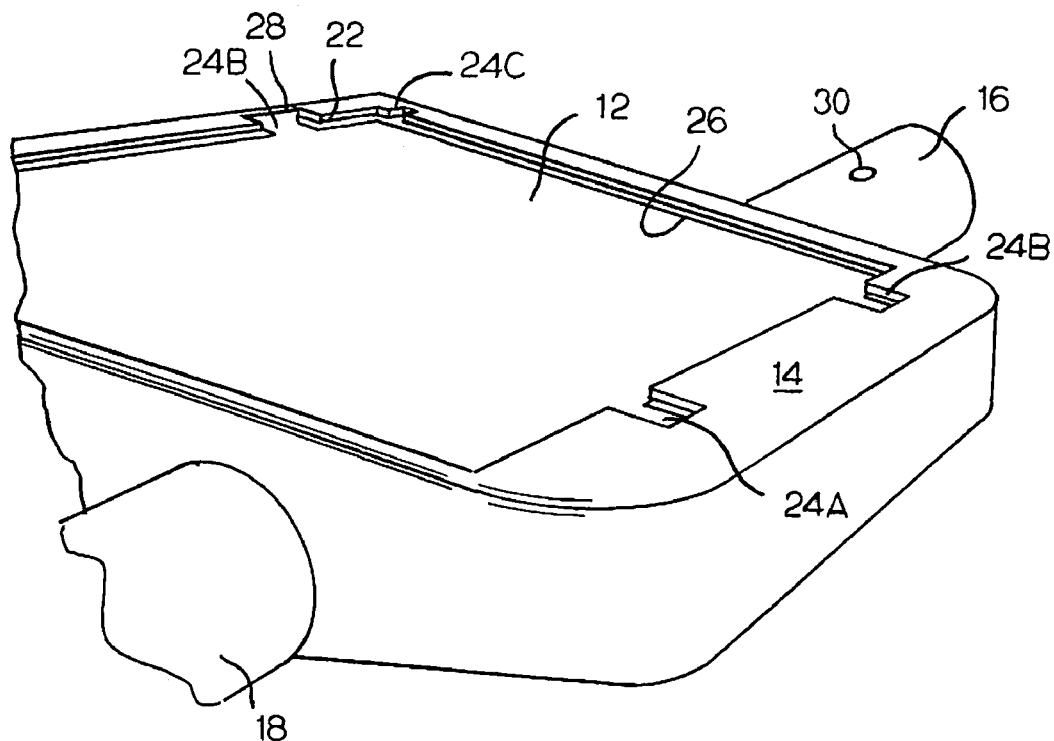
FIG. 9 is a broken-away side perspective view of the device of FIG. 2.
Figure 10:
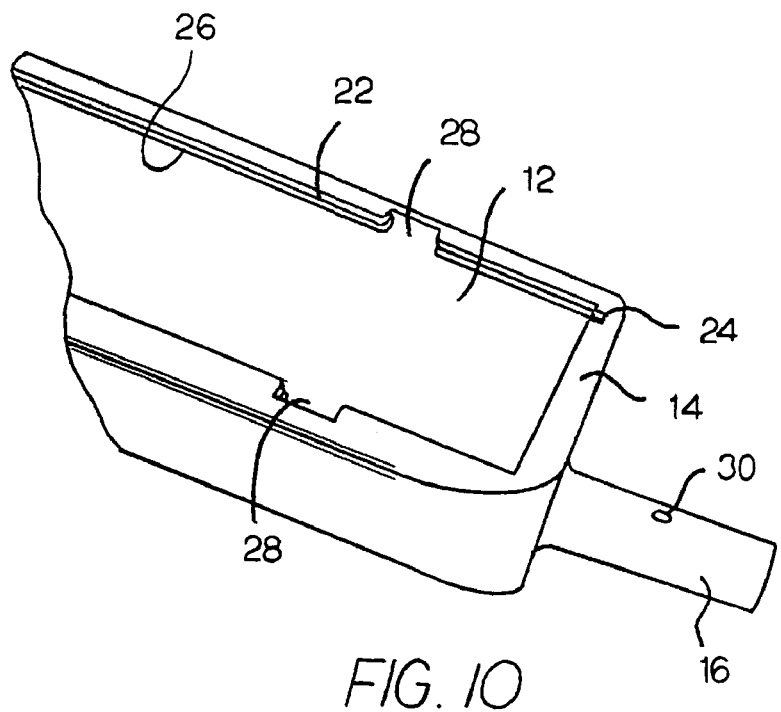
FIG. 10 is a broken-away front perspective view of the device of FIG. 2.

To facilitate the securing of the device 10 to the handlebar 17, the device 10 has holes or partial holes (indentations) 30, shown in FIGS. 1, 2 and 8. The holes or indentations 30 may be through the handles 16, 18 or through the backplate 12 or both. Holes or indentations 30 are countersunk to ensure that the screws (or other fasteners) do not project above the backplate 12 or above the handle surface. Partial holes or indentations 30 could be used instead of through holes in order to guide self-tapping screws into the shopping cart handlebar 17. The screws (or other fasteners) secure the device 10 to the handlebar 17. When the device 10 is mounted on the shopping cart as shown in FIG. 1, the display area 20 of the device 10 is preferably at an acute angle to the horizontal to make it easy for the shopper to see the visual materials mounted on the display area 20. The handles 16, 18 define an imaginary horizontal plane which intersects the edges of the opening 19, and the display area 20 is at an acute angle to that plane. The angle preferably is between 5 and 70 degrees, and most preferably at approximately 20 degrees to the horizontal as shown in FIG. 1.

In this embodiment, as best shown in FIG. 8, there are also several platforms 32 which extend from the rear surface of the device 10 creating more support on the handlebar 17 of the shopping cart. Each platform 32 has a concave arcuate bottom surface, which allows it to wrap partially around the handlebar 17.

Figure 20:
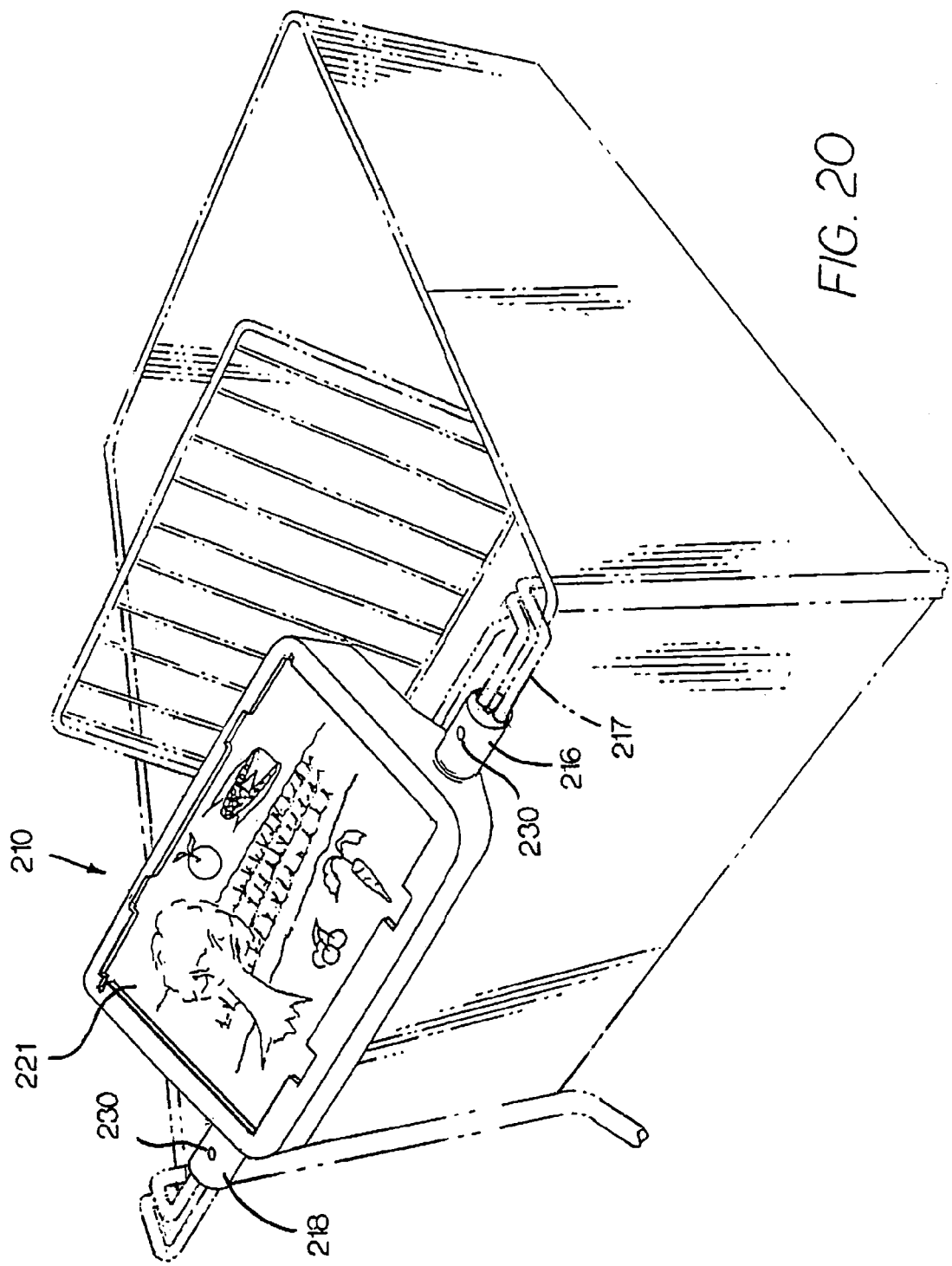
FIG. 20 shows an alternate embodiment of a device mounted on a shopping cart.
Figure 21:
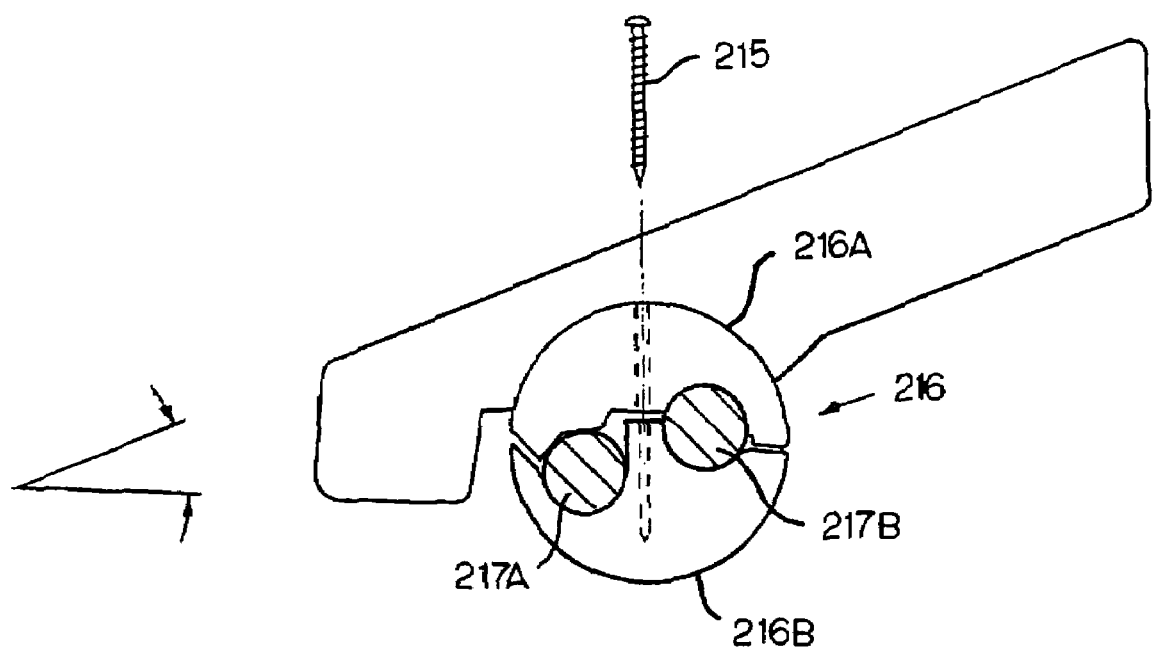
FIG. 21 is a side sectional view showing the device of FIG. 20.

FIGS. 20 and 21 show another embodiment of a device 210 made in accordance with the present invention. This embodiment differs from the previous embodiment in the manner in which it mounts on the shopping cart handlebar 217. In this embodiment, the shopping cart handlebar defines two small bars 217A, 217B, and the device's handlebars connect in a "clamshell" fashion, clamping over the small bars 217A, 217B, which again defines a horizontal plane. FIG. 21 shows the right handle 216. It has a top piece 216A, and a bottom piece 216B. In this embodiment, each half of the handle 216 contains two concave arcuate surfaces which fit around the handlebars 217A, 217B. In this embodiment, a screw 215 is fitted through the hole or indentation 30 to rigidly connect upper and lower halves of the handle 216. Of course, other fastening devices may be used in place of the screw 215. The left handle 218 mounts in the same manner.

Figure 14:
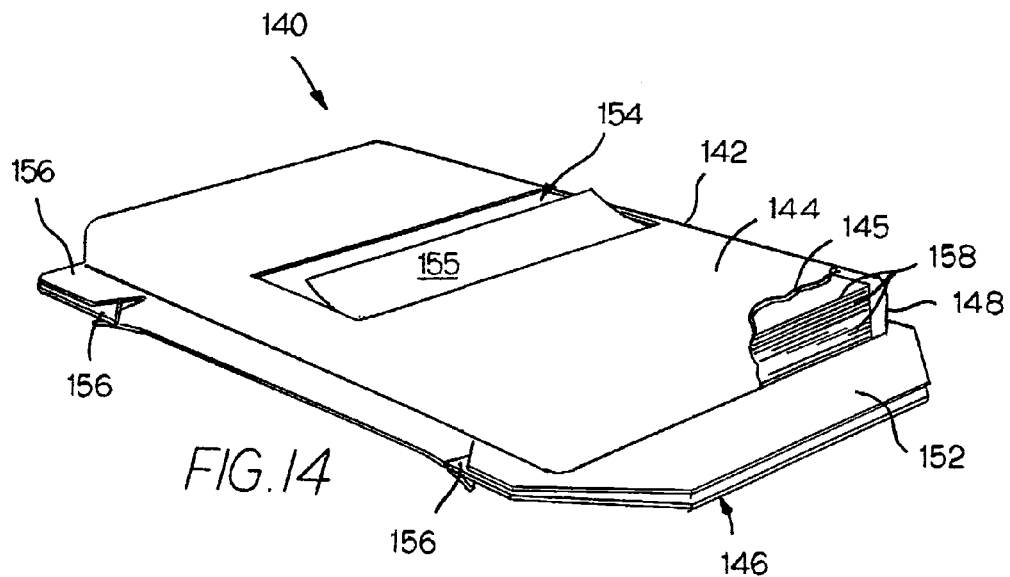
FIG. 14 shows the sheet dispenser of FIG. 1
Figure 15:
FIG. 15 shows one of the sheets of FIG. 14.
Figure 16:
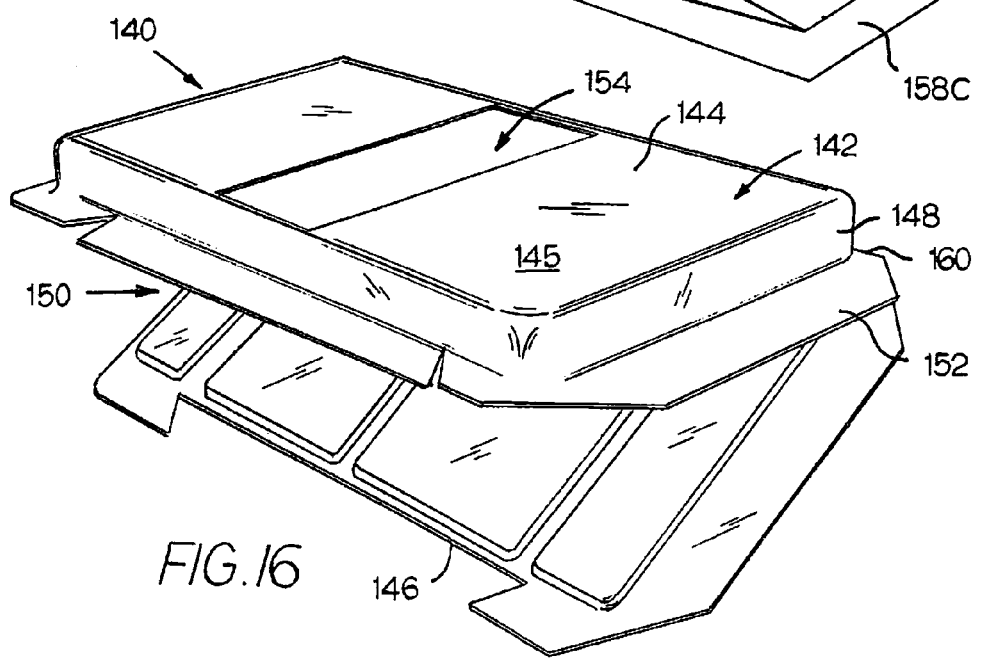
FIG. 16 shows the sheet dispenser of FIG. 14 in the open position.

FIGS. 14 and 16 show one embodiment of a sheet dispenser 140 made in accordance with the present invention. The sheet dispenser 140 includes a housing 142 defining a top wall 144 and a bottom wall 146. The top wall 144 has a top surface 145 at a first elevation and a side surface 148 extending downwardly from the top surface 145 and defines a cavity 150 between the top wall 144 and the bottom wall 146, which houses a plurality of sheets 158, which have the same shape and are stacked directly on top of each other. The top wall 144 has a flange 152 projecting outwardly from the side surface 148 at a substantially lower elevation than the first elevation; the flange 152 extends in a direction generally parallel to the top surface 145 and to the bottom wall 146, and generally perpendicular to the side surface 148. The flange 152 projects outwardly from the side surface 148 along front, rear, left and right side portions, surrounds the periphery of the cavity, and forms the outermost edge of the housing 142. The flange 152 fits beneath the lip 22, while the bottom wall 146 rests on the backplate 12, as will be explained in more detail later.

In this embodiment, the entire housing 142 is made as one piece of clear plastic material which flexes on the right side to form a hinge 160. On the left side, the flange portion 152 and the edge of the bottom wall 146 have flexible flaps 156, which interlock as shown in FIG. 14 to hold the housing in the closed position. The dispenser 140 may open (as in FIG. 16) and close (as in FIG. 14). When in the closed position (as in FIG. 14), these flaps 156 act as a locking mechanism.

There is an opening 154 in the top surface 145 for the removal of sheets 158 stored in the cavity 150. The opening 154 is large enough to permit a human finger to fit into it and wide enough to permit the full width of the sheets to pass through without buckling. The sheets 158 may be coupons, recipes, or any other visual or textual information that the shopper may want to take from the cart. These sheets 158 are made of polypropylene or some other synthetic polymeric material that is both flexible and waterproof. Water can escape the cavity 150 through the space between the flange 152 of the top wall 144 and the bottom wall 146, and can continue through the gap 26 out of the device 10 altogether.

The sheet dispenser may hold a large number of sheets, maybe 20 or more. In this particular embodiment, each sheet 158 in the stack is an elongated, rectangular member, having an elongated direction and being folded back on itself twice along folds 159 that are perpendicular to the elongated direction. The lower layers 158B and 158C extend substantially the full length of the cavity 150, while the top layer 158A extends only part of the length of the cavity, terminating at an end 155, which is aligned with the opening 154. In order to remove a sheet 158 from this dispenser 140, the user need only reach into the cavity end 150 through the opening 154 and pull on the sheet 158 until the sheet slides out of the cavity 150 through the opening 154. The sheet 158 will unfold as it is pulled out. The next sheet 158 in the stack is left in proper position to be similarly removed.

It is also envisioned that the sheets 158 may be provided pre-packaged in the sheet dispenser. When it is time to insert more coupons or other sheets, instead of refilling the sheet dispenser, the user simply disposes of the sheet dispenser 140 and installs a new sheet dispenser full of sheets. This saves the trouble of installing additional sheets into the empty dispenser. However, if the user wanted to put additional sheets into the dispenser, this could be done by separating the interlocking flaps 156 by pulling up on the flange portion 152 of the top wall 144 and pulling down on the corresponding edge of the bottom wall 146, inserting sheets 158 into the cavity 150, and re-closing by re-interlocking the flaps as is best shown in FIG. 14.

Figure 17:
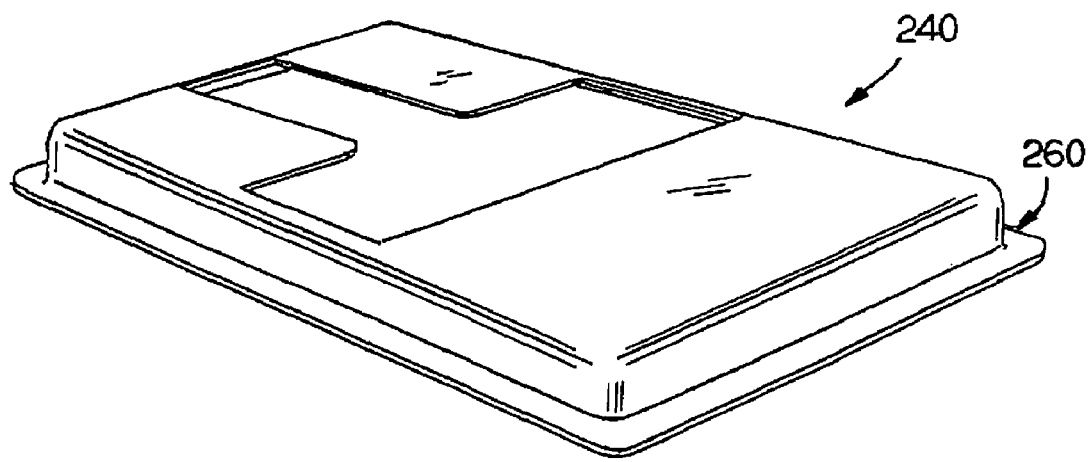
FIG. 17 shows an alternative embodiment of a sheet dispenser for use on the device of FIG. 2.
Figure 18:
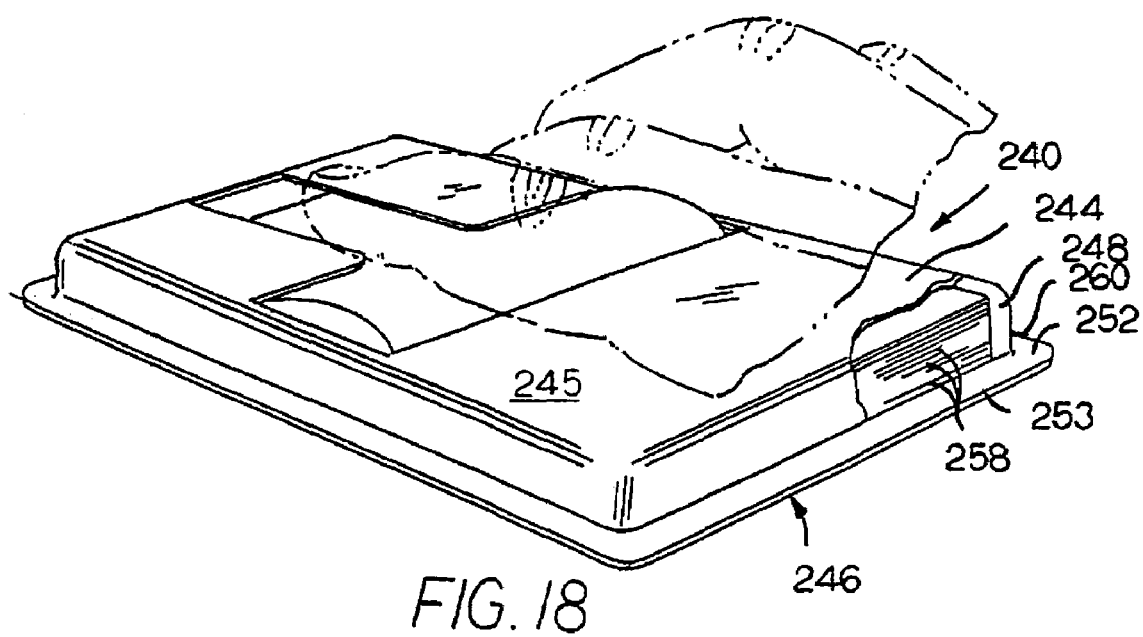
FIG. 18 shows a sheet being removed from the sheet dispenser of FIG. 17.
Figure 19:
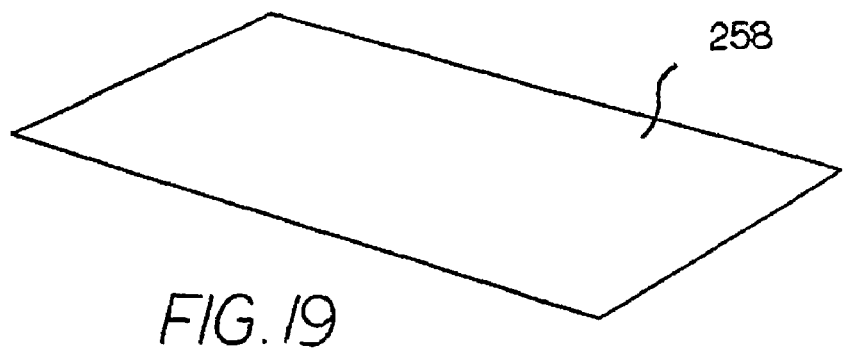
FIG. 19 shows an embodiment of one of the sheets of FIG. 17.

FIG. 17 shows another embodiment of a sheet dispenser 240. Like the previous embodiment, this sheet dispenser 240 includes a bottom wall 246 as well as a top wall 244 having a top surface 245, a side surface 248, and a flange portion 252. It also includes a sheet removal opening 254. However, in this embodiment, the opening 254 is "T"-shaped. (Obviously, other shapes of openings could be used instead.) As shown in FIG. 18, the T-slot is wide enough to receive a human finger. In order to extract a sheet 258, the user inserts a finger into the central leg of the "T" and slides the sheet 258 forward, causing the sheet 258 to buckle enough in the width-wise direction to be gripped between thumb and forefinger, and thereby be removed.

This embodiment, unlike the previous sheet dispenser 140, does not have flaps 156 for potential interlocking and closure; however it is also made of one piece of flexible, strong material (preferably plastic, though other materials could be used) and includes a live hinge 260 as in the previous embodiment. However, in this embodiment, the flange 252 of the top wall 244 is adhered to the bottom wall 246 using a heat-sealing process, which retains the housing in the closed position. Alternatively, other forms of adhesives could be used. The heat seal would not necessarily have to extend around the entire periphery of the dispenser 240; preferably the lower edge would be left unsealed to allow for water to drain out as in the previous embodiment. This embodiment is better suited to be used as a disposable, pre-packaged sheet dispenser than to being refilled.

Figure 11:
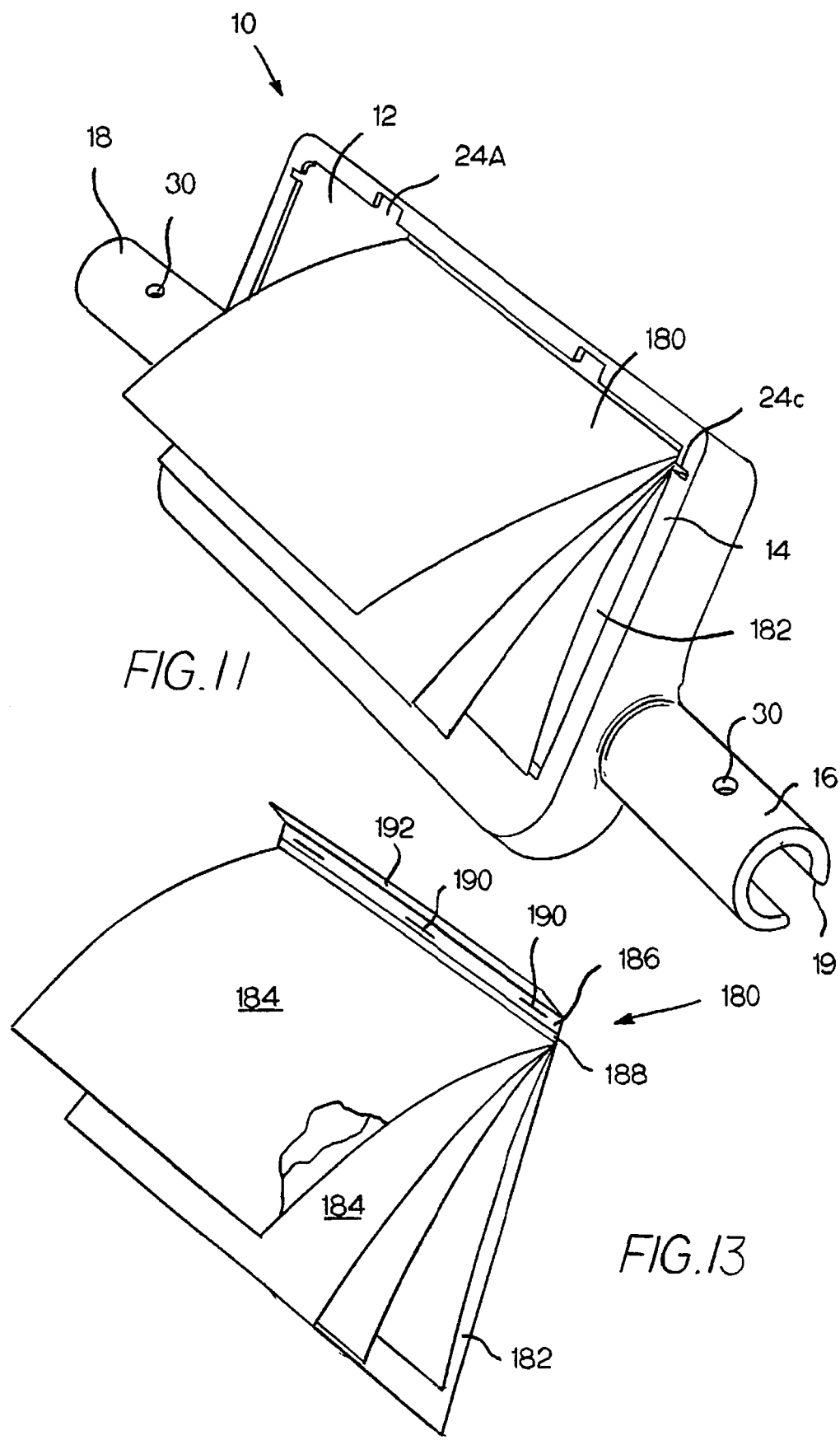
FIG. 11 is a side perspective view of the device of FIG. 2 with a magazine mounted on the device.

Installation of an embodiment of the sheet dispenser 140 or 240 into the device 10 will now be described. FIG. 11 shows the device 10 prior to installation of the sheet dispenser. A magazine 180 (which will be described in detail later) has already been installed on the right side of the device 10, and the sheet dispenser 140 should be aligned for installation on the left side of the device. Such placement can be seen in FIG. 1. Of course, the magazine 180 could be placed on the left, and the sheet dispenser 140 could be installed on the right, and other combinations, such as a dispenser and a card could be used as well.

To install this sheet dispenser 140, the top edge (the rear side portion) of the flange 152 is slid leftwardly under the upper (rear) lip 22 through the discontinuity 24A at the rear of the device, and the bottom edge (the front side portion) of the flange 152 is slid leftwardly under the lower (front) lip 22 through the discontinuity 24A at the front of the device and is pushed to the left until the left edge of the flange 152 (the left side portion) is under the left lip 22, so that the front, rear, and left side portions of the flange 152 are underneath the lip 22, while the bottom wall 146 of the sheet dispenser rests on the backplate 12. As a final step, the right edge of the flange 152 (the right side portion) may be tucked underneath the magazine 180. Even if it is not tucked, however, the sheet dispenser 140 will not slide rightwardly out of device 10, because its top right corner will abut the edge of the discontinuity 24A. Thus, the sheet dispenser 140 is secured on all four sides. As a result, the sheet dispenser 140 or 240 is not easily dislodged in normal use, but it can be removed from the device whenever necessary to insert a new dispenser containing a new pack of sheets. In addition, the back of the sheet dispenser 140 could be adhered to the device 10 with adhesive (not shown), if desired.

In this embodiment, the top page of the magazine 180 is advertising a particular product, and the sheets 158 are coupons which provide a discount for the same product. Thus, this device permits the store to provide fixed, in-store advertising and removable coupons for the same product on the shopping cart, which is very convenient for the shopper.

When a person is shopping, he will see the magazine 180 advertising the product (or service) and can pull out a coupon for that product (or service) to be used as he is checking out at the cash register. Of course, the sheets 158 do not necessarily have to be coupons which match the magazine 180. The sheets 158 could also be announcements, recipes, schedules of in-store TV or radio, or any other graphics or text.

FIG. 13 shows one embodiment of a magazine 180 designed to be inserted into the device 10, as shown in FIGS. 1 and 11. The basic components of the magazine 180 are a rear sheet 182, a spine 186, a live hinge 188, and a top page or plurality of pages 184. Live hinges are thin sections of flexible material, such as plastic, that connect two segments (in this instance the spine 186 and the pages 184) of a part (in this instance the magazine 180) to keep them together and allow the magazine 180 to be opened and closed. The rear sheet 182 is flat and bendable and extends slightly beyond the pages 184 on its bottom edge so that its bottom edge may be tucked under the bottom lip 22 in the device 10 while the edges of the pages 184 are free of the lip 22 and can be opened and closed freely.

Figure 12:
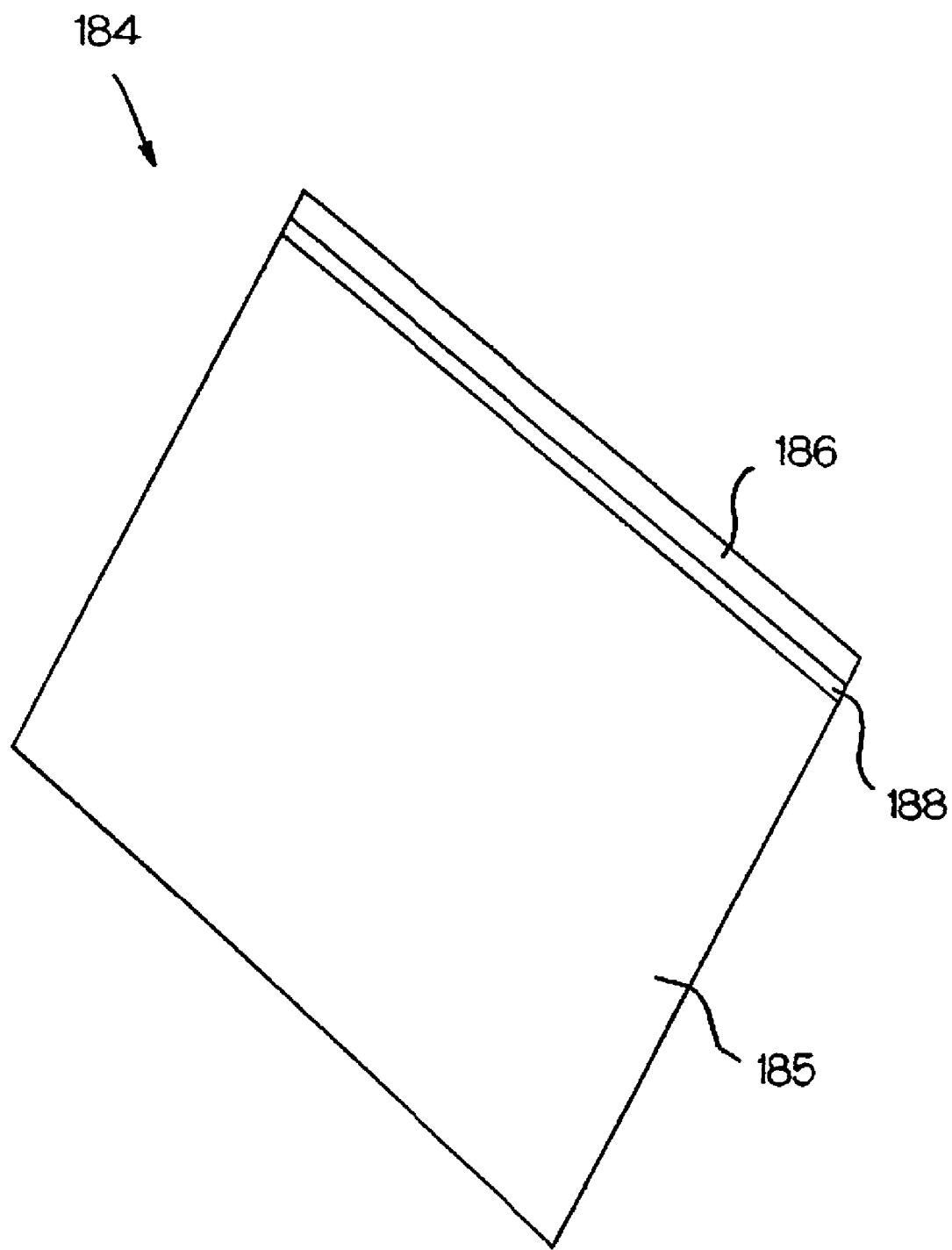
FIG. 12 shows a single "flip-up" page of the magazine of FIG. 11.

As shown in FIG. 12, the pages 184 are made of paper or card stock that has been laminated. The paper or card stock may be made of wood fibers, but it preferably is made of a synthetic polymeric material, such as polypropylene, that is waterproof so it is not necessary to have a complete seal around it. There is a main paper 185 parallel to and spaced apart from an upper paper 186, leaving a space in which the plastic laminate material forms a hinge 188.

The pages 184 are bound to the rear sheet 182 at the spine 186, as shown in FIG. 13. In this embodiment, the pages 184 and rear sheet 182 are stapled together with staples 190. However, the pages could alternatively be glued, stitched, clamped, or bound by other known means to the rear sheet 182. The binding is thin enough that it can fit under the top lip 22 to help secure the magazine 180 to the device 10. It should be noted that the pages 184 shown in FIGS. 11-13 are blank, but the magazine actually contains pages of printed information, which may include text and pictures, as shown in FIG. 1. The information in the magazine could include advertisements, shopping tips, in-store specials, a store directory, a schedule of in-store TV or radio programs, recipes, and the like.

In order to make it easier to flip the pages 184 of the magazine, each page includes a live hinge 188, as described above. The pages bend at the thinner, more flexible laminate strip portion 188 rather than at the thicker, more rigid card portions. The spine 186 itself contains cardstock, paper, or other stiffening material to create a solid surface to attach staples (or other fastening devices) 186, and to create a stronger grip when the spine 186 is installed under the top lip 22 of the device 10. The live hinge 188 is firmly secured to the printed portion of the page, and it provides a place for the pages to bend or fold easily. In this embodiment, the rear page 182 further contains an extended flap 192 of the cardstock above the stapled spine 186. The cardstock (and the whole back page) may or may not be laminated. If it is not laminated, it should be made of a waterproof material. This flap 192 folds back over the top of the spine 186, creating extra thickness to facilitate a strong connection between the magazine 180 and the device 10 as the spine 186 is tucked under the rear lip 22.

The laminate may be vinyl, polyester, polypropylene, nylon, or the like, and it is preferable for the laminate to be clear in order to readily view the material on the paper or cardstock. The magazine 180, the sheet dispenser 140, the sheets 158, and the device 10 are waterproof, as shopping carts are frequently exposed to the various weather elements.

FIG. 11 shows the magazine 180 after it is inserted into the device 10. The flap 192 has been folded over the spine 186, and the spine 186, covered with the flap 192, has been inserted under the rear lip 22. The bottom edge of the rear sheet 182 has been inserted under the front lip 22. The bottom edges of the pages 184 terminate short of the front lip 22, so that the pages 184 can be flipped up to view. The pages 184 fit neatly into the recessed central display area 20 defined by the frame 14 and backplate 12. In this embodiment, the magazine does not fill the entire width of the backplate 12 in order to leave room for additional advertising materials. In this case, the additional space to the left of the magazine 180 is being used for the sheet dispenser 140 as shown in FIG. 1. However, the magazine could extend across the entire width of the frame, if desired.

Also, one or more adhesive strips (not shown) may be used to secure the rear of the magazine 180 and/or coupon dispenser 140 to the device 10. The adhesive strip can be placed on the central portion of the rear face of the rear sheet 182 of the magazine or on the back surface of the sheet dispenser 140, adhering it to the backplate 12. The adhesive strip may conveniently be provided on the back of the magazine 180 or sheet dispenser 140 with a peel-off cover strip that can simply be removed when one is installing the magazine 180 or sheet dispenser onto the device 10.

FIG. 1 shows the magazine 180 inserted alongside a sheet dispenser 140. In this embodiment, the sheet dispenser 140 is mounted with its right flange beneath the rear page of the magazine 180.

A major advantage of this device is that it allows for interactivity between advertisers and customers. For example, shoppers can see an advertisement for an item on a magazine or card mounted on the device 10 and then pick up a corresponding coupon from the sheet dispenser also mounted on the device 10. Shoppers can use store directories and maps on a magazine or card mounted on the device 10 to locate goods (or services) more conveniently. Additionally, this product offers the opportunity for interactivity between the display on the shopping cart and other materials in the store, such as in-store TV or radio programs. For example, an in-store TV may have a program on cooking a particular recipe every hour at ten minutes after the hour. Shoppers can learn about this segment and when to watch it by reading an in-store TV schedule printed in the magazine portion of the display 10, then watch the corresponding program, and, if interested, take the recipe from the sheet dispenser and purchase the required ingredients all in one trip to the store. Alternatively, an in-store radio or television program may refer the shopper to his on-cart display device 10 for recipes, coupons, in-store specials, instructions, or other types of information.

Figure 13A:
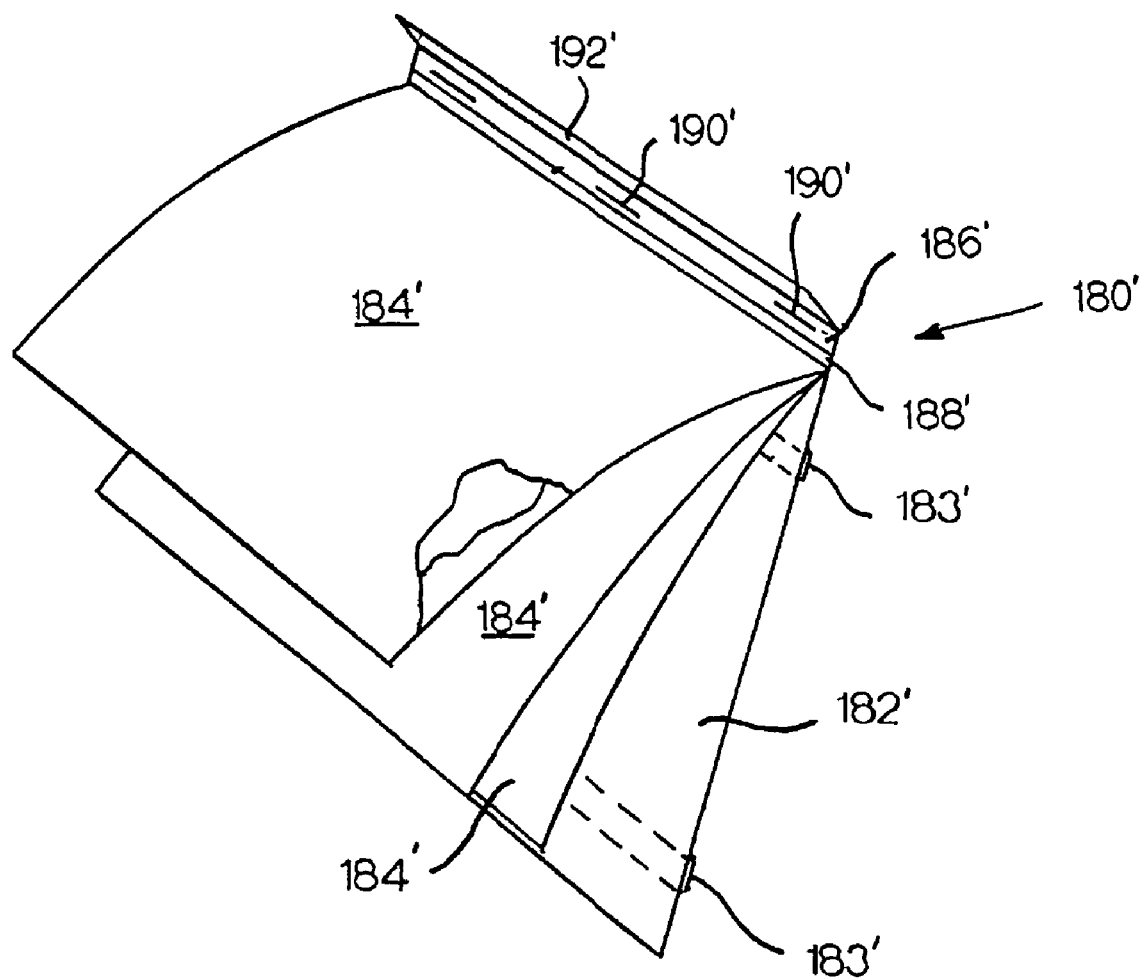
FIG. 13A is a side perspective view of a second embodiment of a magazine.

FIG. 13A depicts another embodiment of a magazine 180' made in accordance with the present invention. This magazine 180' is very similar to the magazine 180 described earlier in that it includes a rear sheet 182', a spine 186', a live hinge 188', and a top page or plurality of pages 184'. The rear sheet 182' is flat, bendable, and transparent; and it does not extend beyond the pages 184' on its bottom edge. That is, all the pages 182' and 184' are substantially the same length.

The pages 184' are bound to the rear sheet 182' at the spine 186', as shown in FIG. 13A. In this embodiment 180', the pages 184' and rear sheet 182' are stapled together with staples 190' at the spine 186', and a tape binding 192' wraps around the front and back of the spine 186', covering the front and back of the staples. However, the pages could alternatively be glued, stitched, clamped, or bound by other known means to the rear sheet 182'. The binding is thin enough that it can fit under the top lip 22 to help secure the magazine 180' to the device 10. It should be noted that the rear page 182' is substantially transparent, such that, when the pages 184' are flipped up to expose the rear sheet 182', the viewer can see right through this rear sheet 182' and see anything that may be printed, or otherwise displayed, on the surface 12 of the display 10. For example, this magazine 180' is mounted on top of the display card 221, covering all or a portion of the display card 221. When the user flips to the back of the magazine 180', he can see through the back of the magazine 180' to view the display card 221.

Preferably, the contents of the pages 184' of the magazine 180' are both generic (that is, they are applicable to a number of different store locations) and temporal in nature (that is, they reflect items which are currently being advertised to the viewer). The clear rear sheet 182' preferably overlies content which is more store specific and permanent in nature (such as a store map/directory). This enables the advertiser to provide a magazine that can be used in many stores while still being able to provide store-specific content.

The magazine 180' also includes a plurality of strips of clear, double-stick tape 183' extending horizontally across the back surface of the clear rear sheet 182' to help secure the magazine 180' to the display 10. Preferably, two strips of clear, double-stick tape 183' are attached to the back of the rear sheet 182', one strip adjacent the binding 186', and a second strip adjacent the bottom edge of the rear sheet 182'. The tape 183' has a peel-off backing, which makes it easy to install it in the field.

This magazine 180' is mounted onto the surface 12 of the display 10 in a very similar manner as was described for the magazine 180 described earlier. The binding 186' is inserted under the top lip 22 to help secure the magazine 180' to the device 10. However, the length of the rear sheet 182' is such that its bottom edge does not reach the opposite, bottom lip 22 of the display 10. Instead, the installer removes the peel-off backing from the double stick tape 183' and then presses the magazine 180' down onto the supporting surface, which, for example, may be the surface 12 of the display 10 or the surface of a display card 221.

It will be obvious to those skilled in the art that modifications may be made to the embodiments described above without departing from the scope of the present invention.

What is claimed is:

1. A sheet dispenser and shopping cart combination, comprising:
    a housing having a top wall and a bottom wall and defining a cavity between said top and bottom walls, said cavity having a periphery;
    a plurality of similarly-shaped sheets stacked on top of each other and received in said cavity;
    said top wall including a top surface at a first elevation defining an opening large enough to receive a human finger for removing sheets from the cavity;
    a side surface substantially surrounding the periphery of said cavity and projecting downwardly from said top surface;
    a flange projecting outwardly from said side surface along a rear side portion, a front side portion, a left side portion, and a right side portion parallel to said top surface at an elevation substantially below the first elevation and forming an outermost edge of said housing, wherein said flange surrounds the periphery of said cavity;
    wherein said housing is a unitary piece which folds onto itself, between an open position and a closed position;
    a body including a backplate having a periphery;
    a frame surrounding the periphery of said backplate and defining a lip spaced above said backplate, said frame defining at least one pair of opposed discontinuities to facilitate the insertion of an object having a generally planar periphery onto said backplate and underneath said lip;
    wherein at least three of said side portions of said flange extend underneath said lip and said bottom wall rests on said backplate;
    left and right handles rigidly secured to and projecting outwardly from said body;
    a shopping cart including a handlebar, wherein said left and right handles rest on and are secured to the handlebar, and wherein said handles are located such that a shopper may grasp the handles to push the shopping cart; and further comprising a generally planar member extending underneath said lip and on top of the fourth of said side portions.

2. A sheet dispenser and shopping cart combination as recited in claim 1, wherein said generally planar member is a magazine including a back and a plurality of flip-up pages bound together along a spine.

3. A sheet dispenser and shopping cart combination as recited in claim 2, wherein said back of said magazine is transparent.

4. A sheet dispenser and shopping cart combination as recited in claim 3, and further comprising a printed display card secured to said backplate and lying between said transparent back and said backplate.

* * * * *